(12) United States Patent
Watanabe

(10) Patent No.: US 7,530,436 B2
(45) Date of Patent: May 12, 2009

(54) RETAINER AND ONE-WAY CLUTCH USING THE RETAINER AND METHOD FOR ASSEMBLING THE ONE-WAY CLUTCH

(75) Inventor: Hajime Watanabe, Kashiwara (JP)

(73) Assignee: JTekt Corporation, Osaka (JP)

( * ) Notice: Subject to any disclaimer, the term of this patent is extended or adjusted under 35 U.S.C. 154(b) by 320 days.

(21) Appl. No.: 10/581,309

(22) PCT Filed: Nov. 30, 2004

(86) PCT No.: PCT/JP2004/017755

§ 371 (c)(1),
(2), (4) Date: Jun. 2, 2006

(87) PCT Pub. No.: WO2005/054702

PCT Pub. Date: Jun. 16, 2005

(65) Prior Publication Data

US 2007/0131508 A1    Jun. 14, 2007

(30) Foreign Application Priority Data

Dec. 5, 2003   (JP) .............................. 2003-407301

(51) Int. Cl.
   *F16D 41/06*   (2006.01)
   *B23P 15/00*   (2006.01)
(52) U.S. Cl. ........................... 192/45; 29/469; 192/41 R
(58) Field of Classification Search ........................ None
   See application file for complete search history.

(56) References Cited

U.S. PATENT DOCUMENTS 3,937,312 A * 2/1976 Gehrke ........................ 192/45
4,915,201 A * 4/1990 Stark et al. ................... 192/45
4,995,489 A * 2/1991 Lederman et al. ............. 192/45
5,617,937 A * 4/1997 Zettner et al. ................. 192/45
5,941,355 A   8/1999 Iga
6,588,560 B1  7/2003 Fujiwara
2002/0183147 A1  12/2002 Fujiwara

FOREIGN PATENT DOCUMENTS

| JP | 10-184735 | 7/1998 |
| JP | 2001-141037 | 5/2001 |
| JP | 2002-295521 | 10/2002 |

OTHER PUBLICATIONS

Translation of the International Preliminary Report on Patentability mailed Aug. 3, 2006 in corresponding PCT application PCT/JP2004/017755.
International Search Report for PCT/JP2004/017755 dated Mar. 1, 2005.

* cited by examiner

Primary Examiner—Rodney H Bonck
(74) Attorney, Agent, or Firm—Nixon & Vanderhye P.C.

(57) ABSTRACT

An outer peripheral cylindrical surface 13, 17, which is a non-engagement outer peripheral surface, is formed in an outer periphery of an annular portion 3 and a portion 15 of each of pillar portions 4, while an engagement portion formed of an edge 9 is formed on an outer periphery of the other annular portion 2 and another portion 14 of each of the pillar portions 4. The outer peripheral cylindrical surface 13, 17 is formed inside a circle smaller by a specified size than a circumcircle of the edges 9.

19 Claims, 3 Drawing Sheets

RETAINER AND ONE-WAY CLUTCH USING THE RETAINER AND METHOD FOR ASSEMBLING THE ONE-WAY CLUTCH

This application is the U.S. national phase of international application PCT/JP2004/017755 filed 30 Nov. 2004, which designated the U.S. and claims benefit of JP 2003-407301 filed 5 Dec. 2003, the entire contents of each of which are hereby incorporated by reference.

BACKGROUND

The disclosed technology relates to a retainer and a one-way clutch using the retainer as well as to a method for assembling the one-way clutch.

Conventionally, there has been a retainer shown in FIG. 6 for use in one-way clutches. This retainer has a first annular portion 81, a second annular portion 82 confronting the first annular portion 81, and six pillar portions 85 for connecting the first annular portion 81 and the second annular portion 82 to each other. Then, six pockets 87 are formed between the six pillar portions 85. It is noted that reference numeral 92 denotes a protruding portion to which an unshown coil spring is to be fitted.

Outer peripheral surfaces of the first and second annular portions 81, 82 are formed into an identical generally regular hexagonal shape. The pillar portions 85 are formed by axially extending six edges of the outer peripheral surface of the first annular portion 81 and six edges of the outer peripheral surface of the second annular portion 82. Outer ends of the pillar portions 85 serve as edges 90 of the regular polyhedron.

The outer peripheral surfaces having a generally regular hexagonal shape in its cross section of the two annular portions 81, 82 and the outer peripheral surfaces of the pillar portions 85, upon assembling of a one-way clutch, are to be engaged with an inner circumferential cam surface of an unshown outer ring of the one-way clutch having a generally regular hexagonal shape in its cross section. Also, the edges 90 axially extending overall between outer ends of the two annular portions 81, 82, upon assembling of the one-way clutch, are to be engaged with the vertices of the inner circumferential cam surface of the outer ring having a generally regular hexagonal shape in its cross section. The edges 90 serve as engagement portions for blocking the retainer from rotating peripherally relative to the outer ring.

The retainer shown in FIG. 6 is assembled to the one-way clutch as follows.

First, an unshown roller as a wedge member is placed at each pocket 87 of the retainer, and an unshown coil spring fitted to the protruding portion 92 is placed between pillar portion 85 and roller in the retainer. With the rollers biased to the pillar portions of the retainer by the coil springs, a retainer assembly is made up.

Next, while the vertices of the inner circumferential cam surface of the unshown outer ring of the one-way clutch, and the edges 90 of the retainer, are set in phase with each other, end faces of the rollers are brought into contact with inside end faces of an unshown inner ring and the outer ring between the inner circumferential cam surface of the outer ring and an outer circumferential cylindrical surface of the inner ring. Then, in this state, a roller present at a position which is in phase with a wedge position of a narrow radial distance between the outer and inner rings is moved peripherally to a position which is in phase with a clearance-fit position located between the inner circumferential cam surface of the outer ring and the outer circumferential surface of the inner ring by exclusive-use equipment.

Finally, with the roller located at a position which is in phase with the clearance-fit position, the retainer assembly is pushed axially to between the inner circumferential cam surface of the outer ring and the outer circumferential surface of the inner ring of the one-way clutch so that the roller is positioned between the inner circumferential cam surface of the outer ring and the outer circumferential surface of the inner ring. Thus, the assembling of the one-way clutch is completed.

Another retainer to be used for one-way clutches is shown in FIG. 3 of JP 2001-141037 A.

This retainer has an inner peripheral surface shaped into a regular octagon and an outer peripheral cylindrical surface, and is otherwise essentially similar to the retainer shown in FIG. 6.

However, with the use of the prior art retainer shown in FIG. 6, there is a problem that the assembling of the one-way clutch involves the need for exclusive-use equipment for moving the roller, which is present at a position in phase with an engagement position where the radial distance between outer and inner rings is narrower than the diameter of the roller, up to a position in phase with a clearance-fit position.

Also, because of a need for setting the outer ring, the inner ring and the retainer assembly to the exclusive-use equipment, there is another problem that man-hours required for the assembling of the one-way clutch is increased, which leads to an increase in the assembling cost of the one-way clutch.

SUMMARY

Accordingly, an object is to provide a retainer which allows a one-way clutch to be assembled with simplicity and low cost without using any exclusive-use equipment, as well as a one-way clutch using the retainer, and also provide a method for assembling the one-way clutch.

In order to achieve the above object, in a first aspect, there is provided a retainer comprising:

two annular portions; and a plurality of pillar portions for connecting the two annular portions to each other to define a plurality of pockets in combination with the annular portions, wherein an engagement portion to be engaged with an outer ring is formed on an outer periphery of at least one annular portion of the two annular portions and part of each of the pillar portions located on the annular portion side to block the retainer from rotating circumferentially relative to the outer ring, a non-engagement outer peripheral surface which is not engaged with the outer ring is formed on an outer peripheral surface of the other annular portion and part of each of the pillar portions located on the annular portion side, and the non-engagement outer peripheral surface is located inside a circle smaller by a specified size than a circumcircle of the engagement portion.

In assembling of a one-way clutch with the retainer according to the first aspect, first, rollers are placed in the pockets of the retainer and moreover the biasing members are placed between the pillar portions of the retainer and the rollers, by which a retainer assembly is formed. Next, the non-engagement outer peripheral surface of the retainer of the retainer assembly is inserted axially in an non-engagement state to between an inner peripheral engagement surface of the outer ring and an outer peripheral surface of an inner ring of the one-way clutch such that part of the roller is placed at a position where the roller is clearance-fitted between the inner peripheral engagement surface of the outer ring and the outer peripheral surface of the inner ring of the one-way clutch.

Next, the retainer assembly is rotated until a peripheral position of the engagement portion of the retainer and a peripheral position of an engagement portion of the outer ring becomes coincident with each other, and thereafter the retainer assembly is inserted axially all the way to the end between the inner peripheral engagement surface of the outer ring and the outer peripheral surface of the inner ring so that the engagement portion of the retainer and the engagement portion of the outer ring are engaged with each other. Thus, the assembly of the one-way clutch is completed.

According to the retainer of the first aspect, since a non-engagement outer peripheral surface positioned inside a circle smaller by a specified size than the circumcircle of the engagement portions of the retainer is provided on the outer peripheral surface of the other annular portion and part of each of the pillar portions positioned on the annular portion side, part of the roller can be inserted beforehand at a clearance-fit position between the inner peripheral engagement surface of the outer ring and the outer peripheral surface of the inner ring before making the engagement portion of the retainer and the engagement portion of the outer ring coincident with each other in peripheral position and inserting the retainer assembly to between the inner peripheral engagement surface of the outer ring and the outer peripheral surface of the inner ring of the one-way clutch.

Therefore, because there is no need for moving the rollers located near wedge positions to near the clearance-fit positions by using some exclusive-use equipment, which would be needed in the conventional assembling method for one-way clutches, the one-way clutch can be assembled with simplicity and low cost and without involving any exclusive-use equipment with the use of the retainer of the first aspect of the invention.

In one embodiment, the non-engagement outer peripheral surface is a cylindrical surface.

According to this embodiment, since the non-engagement outer peripheral surface is a cylindrical surface, the non-engagement outer peripheral surface can be machined with simplicity, so that the retainer can be manufactured with low cost.

In a second aspect, there is provided a retainer comprising:
   two annular portions; and
   a plurality of pillar portions for connecting the two annular portions to each other to define a plurality of pockets in combination with the annular portions, wherein
   an engagement portion to be engaged with an inner ring is formed on an inner periphery of at least one annular portion of the two annular portions and part of each of the pillar portions located on the annular portion side to block the retainer from rotating circumferentially relative to the inner ring,
   a non-engagement inner peripheral surface which is not engaged with the inner ring is formed on an inner peripheral surface of the other annular portion and part of each of the pillar portions located on the annular portion side, and
   the non-engagement inner peripheral surface is located outside a circle larger by a specified size than a circumcircle of the engagement portion.

In assembling of a one-way clutch with the retainer according to the second aspect, first, rollers are placed in the pockets of the retainer and moreover the biasing members are placed between the pillar portions of the retainer and the rollers, by which a retainer assembly is formed. Next, the non-engagement inner peripheral surface of the retainer of the retainer assembly is inserted axially in an non-engagement state to between an inner peripheral surface of an outer ring and an outer peripheral engagement surface of the inner ring of the one-way clutch such that part of the roller is placed at a position where the roller is clearance-fitted between the inner peripheral surface of the outer ring and the outer peripheral engagement surface of the inner ring of the one-way clutch. Finally, the retainer assembly is rotated until a peripheral position of the engagement portion of the retainer and a peripheral position of an engagement portion of the inner ring becomes coincident with each other, and thereafter the retainer assembly is inserted axially all the way to the end between the inner peripheral surface of the outer ring and the outer peripheral engagement surface of the inner ring so that the engagement portion of the retainer and the engagement portion of the inner ring are engaged with each other. Thus, the assembly of the one-way clutch is completed.

According to the retainer of the second aspect, since a non-engagement inner peripheral surface positioned outside a circle larger by a specified size than the circumcircle of the engagement portions is provided on the inner peripheral surface of the other annular portion and part of the pillar portions positioned on the annular portion side, part of the roller can be inserted beforehand at a clearance-fit position between the inner peripheral surface of the outer ring and the outer peripheral engagement surface of the inner ring before making the engagement portion of the retainer and the engagement portion of the inner ring coincident with each other in peripheral position and inserting the retainer assembly to between the inner peripheral surface of the outer ring and the outer peripheral engagement surface of the inner ring of the one-way clutch. Therefore, because there is no need for moving the rollers located near wedge positions to near the clearance-fit positions by using some exclusive-use equipment, which would be needed in the conventional assembling method for one-way clutches, the one-way clutch can be assembled with simplicity and low cost and without involving any exclusive-use equipment with the use of the retainer of the second aspect.

In one embodiment, the non-engagement inner peripheral surface is a cylindrical surface.

According to this embodiment, since the non-engagement inner peripheral surface is a cylindrical surface, the non-engagement inner peripheral surface can be machined with simplicity, so that the retainer can be manufactured with low cost.

Also in the first aspect, there is provided a one-way clutch comprising:
   an outer ring having an inner peripheral engagement surface which is a cam surface having a generally polygonal shape in its cross section;
   an inner ring having an outer peripheral surface which is a circumferential surface;
   the retainer of the first aspect of the invention placed between the inner peripheral engagement surface and the outer peripheral surface;
   rollers placed in the pockets of the retainer; and
   biasing members for respectively biasing the rollers in one circumferential direction.

According to the one-way clutch of the first aspect, since the retainer of the first aspect of the invention is included, the retainer assembly in which the rollers are placed in the pockets of the retainer and in which the biasing members are placed between the pillar portions of the retainer and the rollers can be inserted to between the outer peripheral surface of the inner ring and the inner peripheral engagement surface of the outer ring with simplicity and low cost without using any exclusive-use equipment. Therefore, the one-way clutch can be assembled with simplicity and low cost.

In a second aspect, there is provided a one-way clutch comprising:

an outer ring having an inner peripheral surface which is a circumferential surface;

an inner ring having an outer peripheral engagement surface which is a cam surface having a generally polygonal shape in its cross section;

the retainer of the second aspect of the invention placed between the inner peripheral surface and the outer peripheral engagement surface;

rollers placed in the pockets of the retainer; and biasing members for respectively biasing the rollers in one circumferential direction.

According to the one-way clutch of the second aspect, since the retainer according to the second aspect of the invention is included, the retainer assembly in which the rollers are placed in the pockets of the retainer and the biasing members are placed between the pillar portions of the retainer and the rollers can be inserted to between the outer peripheral engagement surface of the inner ring and the inner peripheral surface of the outer ring with simplicity and low cost without using any exclusive-use equipment. Therefore, the one-way clutch can be assembled with simplicity and low cost.

Also in the first aspect, there is provided a method for assembling a one-way clutch comprising:

forming a retainer assembly by respectively placing rollers in the pockets of the retainer of the first aspect of the invention and placing biasing members such that each biasing member is disposed between the pillar portion of the retainer and the roller corresponding to the pillar portion;

inserting the non-engagement outer peripheral surface of the retainer of the retainer assembly axially in an non-engagement state to between an inner peripheral engagement surface of an outer ring and an outer peripheral surface of an inner ring of the one-way clutch so that the roller of the retainer assembly is disposed in a position where the roller is clearance-fitted between the inner peripheral engagement surface of the outer ring of the one-way clutch, which is a cam surface having a generally polygonal shape in its cross section, and the outer peripheral surface, which is a circumferential surface of the inner ring; and rotating the retainer assembly such that the engagement portion of the retainer becomes coincident in peripheral position with the engagement portion of the outer ring and thereafter further inserting the retainer assembly axially between the outer peripheral surface of the inner ring and the inner peripheral engagement surface of the outer ring such that the engagement portion of the retainer and the engagement portion of the outer ring are engaged with each other.

According to the method for assembling the one-way clutch of the first aspect, the one-way clutch can be assembled with simplicity and low cost without using any exclusive-use equipment.

Also in the second aspect, there is provided a method for assembling a one-way clutch comprising:

forming a retainer assembly by respectively placing rollers in the pockets of the retainer of the second aspect of the invention and placing biasing members such that each biasing member is disposed between the pillar portion of the retainer and the roller corresponding to the pillar portion;

inserting the non-engagement inner peripheral surface of the retainer of the retainer assembly axially in an non-engagement state to between an inner peripheral surface of an outer ring and an outer peripheral engagement surface of an inner ring of the one-way clutch so that the roller of the retainer assembly is disposed in a position where the roller is clearance-fitted between the inner peripheral surface, which is a circumferential surface of the outer ring, and the outer peripheral engagement surface, which is a cam surface of the inner ring having a generally polygonal shape in its cross section, of the inner ring of the one-way clutch; and rotating the retainer assembly such that the engagement portion of the retainer becomes coincident in peripheral position with the engagement portion of the inner ring and thereafter further inserting the retainer assembly axially between the outer peripheral engagement surface of the inner ring and the inner peripheral surface of the outer ring such that the engagement portion of the retainer and the engagement portion of the inner ring are engaged with each other.

According to the method for assembling the one-way clutch of the second aspect, the one-way clutch can be assembled with simplicity and low cost without using any exclusive-use equipment.

According to the retainer of the first aspect, a non-engagement outer peripheral surface positioned inside a circle smaller by a specified size than the circumcircle of the engagement portions of the retainer is provided on the outer peripheral surface of the other annular portion and part of each of the pillar portions positioned on the annular portion side. Therefore, part of the roller of the retainer assembly wherein the retainer assembly is formed by setting the rollers and the biasing members in the retainer can be inserted beforehand at clearance-fit positions between the inner peripheral engagement surface of the outer ring and the outer peripheral surface of the inner ring before making the engagement portion of the retainer and the engagement portion of the outer ring coincident with each other in peripheral position and inserting the retainer assembly to between the inner peripheral engagement surface of the outer ring and the outer peripheral surface of the inner ring of the one-way clutch. Therefore, because there is no need for moving the rollers located near wedge positions to near the clearance-fit positions by using some exclusive-use equipment, which would be needed in the one-way clutch assembling method using conventional retainers, the one-way clutch can be assembled with simplicity and low cost.

In the retainer of one embodiment, since the non-engagement outer peripheral surface is a cylindrical surface, the non-engagement outer peripheral surface can be machined with simplicity, so that the retainer can be manufactured with low cost.

According to the retainer of the second aspect, a non-engagement inner peripheral surface positioned outside a circle larger by a specified size than the circumcircle of the engagement portions is provided on the inner peripheral surface of the other annular portion and part of each of the pillar portions positioned on the annular portion side. Therefore, part of the rollers of the retainer assembly wherein the retainer assembly is formed by setting the rollers and the biasing member in the retainer can be inserted beforehand at clearance-fit positions between the inner peripheral surface of the outer ring and the outer peripheral engagement surface of the inner ring before making the engagement portion of the retainer and the engagement portion of the inner ring coincident with each other in peripheral position and inserting the retainer assembly to between the inner peripheral surface of the outer ring and the outer peripheral engagement surface of the inner ring of the one-way clutch. Therefore, because there is no need for moving the rollers located near wedge positions to near the clearance-fit positions by using some exclusive-use equipment, which would be needed in the one-way clutch assembling method using conventional retainers, the one-way clutch can be assembled with simplicity and low cost.

In the retainer of one embodiment, since the non-engagement inner peripheral surface is a cylindrical surface, the non-engagement inner peripheral surface can be machined with simplicity, so that the retainer can be manufactured with low cost.

According to the one-way clutch of the first aspect, since the retainer of the first aspect of the invention is included, the retainer assembly can be inserted to between the inner peripheral engagement surface of the outer ring and the outer peripheral surface of the inner ring with simplicity without using any exclusive-use equipment. Thus, the one-way clutch can be assembled with simplicity and low cost.

Further, according to the one-way clutch of the second aspect, since the retainer of the second aspect of the invention is included, the retainer assembly can be inserted to between the inner peripheral surface of the outer ring and the outer peripheral engagement surface of the inner ring with simplicity without using any exclusive-use equipment. Thus, the one-way clutch can be assembled with simplicity and low cost.

Further, according to the method for assembling the one-way clutch of the first and second aspect, the one-way clutch can be assembled with simplicity and low cost without using any exclusive-use equipment.

DETAILED DESCRIPTION

Hereinbelow, the present invention will be described in detail by embodiments thereof illustrated in the accompanying drawings.

Figure 1:
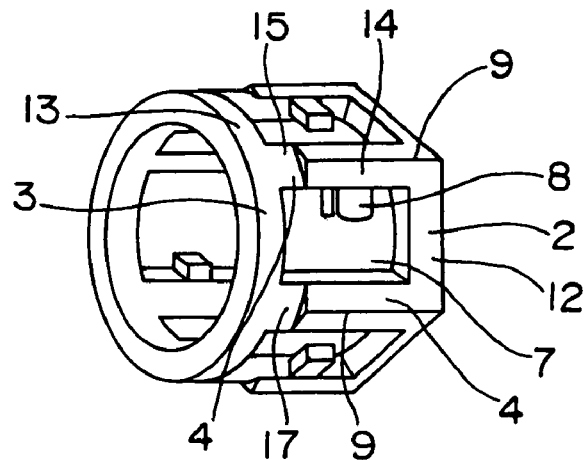
FIG. 1 is a view showing an embodiment of the retainer in a first aspect.

FIG. 1 shows a retainer for use with a one-way clutch according to an embodiment of the retainer in a first aspect. The retainer includes an annular portion 2, an annular portion 3 confronting the annular portion 2, and six pillar portions 4 for connecting the annular portion 2 and the annular portion 3 to each other. Six pockets 7 are formed between the six pillar portions 4. It is noted that reference numeral 8 denotes a protruding portion to which an unshown coil spring as an example of biasing member is to be fitted.

The annular portion 2 has an outer peripheral surface 12 having a generally regular hexagonal shape in its cross section and a cylindrical inner peripheral surface. The annular portion 3 has an outer circumferential cylindrical surface 13 smaller in radial size than a circumcircle of edges 9 of the outer peripheral surface 12 of the annular portion 2 having a generally regular hexagonal shape in its cross section, and a cylindrical inner peripheral surface equal in inner diameter to the cylindrical inner peripheral surface of the annular portion 2.

Each of the six pillar portions 4 has a triangular-prismatic portion 14 which is formed by axially extending an edge 9 of the annular portion 2 and which is a larger axial length, and an axially smaller-sized portion 15 which adjoins the triangular-prismatic portion 14 and which has an outer circumferential cylindrical surface 17 formed by axially extending part of the annular portion 3.

Each of the edges 9 ranging from an axial outer end of the annular portion 2 in the outer peripheral surface of the annular portion 2 to the axially larger triangular-prismatic portion 14 of the pillar portion 4 serves as an engagement portion of the retainer. In more detail, the edges 9, upon assembling of the one-way clutch, are engaged with the engagement portions of the outer ring of the unshown one-way clutch, thereby blocking the retainer from peripherally rotating relative to the outer ring.

Meanwhile, the outer circumferential cylindrical surface 13, 17 extending from an outer end of the annular portion 3 to the axially smaller-sized portions 15 of the pillar portions 4 serves as a non-engagement outer peripheral surface positioned inside a circle which is smaller by a specified size than the circumcircle of the edges 9 serving as engagement portions.

Figure 2:
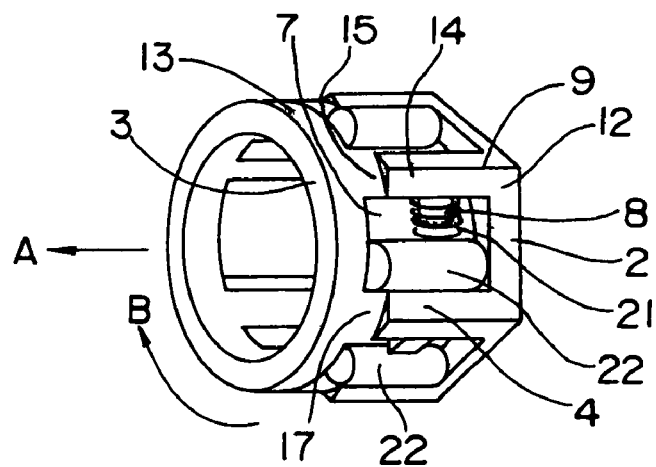
FIG. 2 is a view showing a retainer assembly including rollers and coil springs set on the retainer of FIG. 1.

FIG. 2 shows a retainer assembly formed by using the retainer of the embodiment shown in FIG. 1.

This retainer assembly is so formed that a coil spring 21 as an example of the biasing member is placed at each protruding portion 8 and moreover a roller 22 is placed at each pocket 7 of the retainer. In this retainer assembly, the coil spring 21 biases the roller 22 up to the pillar portion 4. Also, part of the roller 22 is exposed from a clearance part of the pocket 7 peripherally corresponding to the axially smaller-sized portions 15 and 15.

Figure 3:
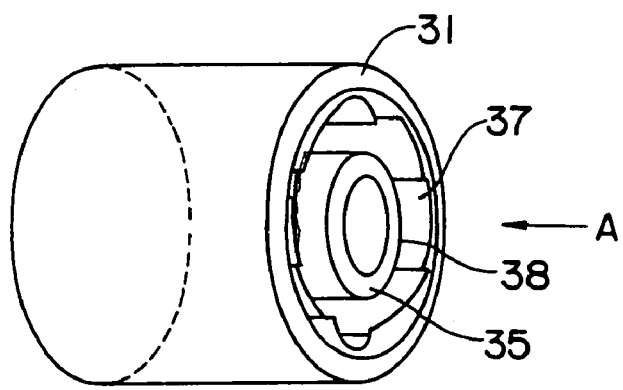
FIG. 3 is a view showing an outer ring and an inner ring by which a space to which the retainer assembly of FIG. 2 is to be fitted is defined.

FIG. 3 shows an outer ring 31 and an inner ring 35 which define a space to which the retainer assembly shown in FIG. 2 is to be fitted.

The outer ring 31 has an inner peripheral cam surface 37 having a generally regular hexagonal shape in its cross section as an example of an inner peripheral engagement surface which is to be engaged with the outer peripheral surface 12 of the annular portion 2 having a generally regular hexagonal shape in its cross section and with an outer peripheral surface of the axially larger-sized triangular-prismatic portion 14 in the pillar portion 4. The inner ring 35, on the other hand, has an outer peripheral cylindrical surface 38 serving as an outer peripheral surface to which the inner peripheral cylindrical surfaces of the annular portions 2, 3 are to be fitted.

Vertices of the inner peripheral cam surface 37 of the outer ring 31 each having a generally regular hexagonal shape in its cross section serve as engagement portions. The vertices of the inner peripheral cam surface 37, upon assembling of the one-way clutch, are to be engaged with the edges 9 serving as engagement portions of the retainer, thereby immobilizing the retainer relative to the outer ring 31.

Referring to FIGS. 2 and 3, the method for assembling the one-way clutch according to an embodiment of the present invention is described below.

First, the roller 22 placed at the pocket 7 is set to confront the position where the roller 22 of the retainer assembly shown in FIG. 2 is clearance-fitted between the inner peripheral cam surface 37 of the outer ring 31 and the outer peripheral cylindrical surface 38 of the inner ring 35 shown in FIG. 3. Then, in this state, the outer peripheral cylindrical surfaces 13, 17, which are non-engagement outer peripheral surfaces of the retainer assembly, is inserted axially in a non-engagement state in a direction indicated by arrow A in FIGS. 2 and 3 (arrows A in FIGS. 2 and 3 are assumed as the same one) between the inner peripheral cam surface 37 of the outer ring 31 and the outer peripheral cylindrical surface 38 of the inner ring 35. In this way, part of the roller 22 exposed from between the axially smaller-sized portions 15 outside the pockets 7 is set to a position where the roller 22 of the retainer assembly shown in FIG. 2 is clearance-fitted between the inner peripheral cam surface 37 of the outer ring 31 and the outer peripheral cylindrical surface 38 of the inner ring 35 shown in FIG. 3.

Next, the retainer assembly is rotated in a direction shown by arrow B in FIG. 2 so that the edges 9 of the retainer of the retainer assembly shown in FIG. 2 and the vertices of the inner peripheral cam surface 37 of the outer ring 31 become coincident with each other in peripheral position. Thereafter, the retainer assembly is inserted between the inner peripheral cam surface 37 of the outer ring 31 and the outer peripheral cylindrical surface 38 of the inner ring 35 all the way to the end axially in the direction shown by arrow A in FIGS. 2 and 3. Thus, the edges 9 of the retainer and the vertices of the inner peripheral cam surface 37 of the outer ring 31 are engaged with each other, respectively, by which the assembling of the one-way clutch according to an embodiment of the invention is completed.

According to the retainer of this embodiment, since the outer circumferential cylindrical surface 13, 17, which is positioned inside a circle which is smaller by a specified size than the circumcircle of the edges 9 serving as engagement portions of the retainer, is formed so as to range from the axial end portion of the annular portion 3 to part of the pillar portions 4, part of each roller 22 exposed from a portion of the pockets 7 between the outer peripheral cylindrical surfaces 17 of the pillar portions 4, which are portions of the non-engagement outer peripheral surfaces, can be inserted to clearance-fit positions between the inner peripheral cam surface 37 of the outer ring 31 and the outer peripheral cylindrical surface 38 of the inner ring 35 at the beginning of the assembly process for assembling the retainer to the one-way clutch.

Therefore, the one-way clutch can be assembled with simplicity and low cost and without involving any exclusive-use equipment because there is no need for moving the rollers located near wedge positions to near the clearance-fit positions by using some exclusive-use equipment, which would be needed in the conventional assembling method for one-way clutches.

Also, according to the retainer of the embodiment, since the non-engagement outer peripheral surface is provided by the outer peripheral cylindrical surface 13, 17, the non-engagement outer peripheral surface can be machined easily, so that the retainer can be manufactured with low cost.

In addition, in the retainer of this embodiment, the non-engagement outer peripheral surface ranging from the outer end of the annular portion 3 to the axially smaller-sized portions 15 of the pillar portions 4, i.e., the non-engagement outer peripheral surface that is formed in the outer peripheral surfaces of the annular portion 3 and part of the pillar portions 4 located on the annular portion 3 side and that is not engaged with the outer ring 31 is formed by the outer peripheral cylindrical surfaces 13, 17 that are equal in diameter to each other and that are located inside a circle which is smaller by a specified size than a circumcircle of the edges 9 serving as the engagement portions of the retainer.

However, the non-engagement outer peripheral surface ranging from the outer end of one annular portion of the two to the axially smaller-sized portion of the pillar portion may also be formed by, for example, an outer peripheral surface having a polygonal or other shape in its cross section and located inside a circle which is smaller by a specified size than the circumcircle of the edges serving as the engagement portions of the retainer.

Also, a plurality of outer peripheral surfaces of different diameters which are located inside a circle smaller by a specified size than the circumcircle of the edges serving as the engagement portions of the retainer and which adjoin each other via a step portion may be formed at portions each ranging from the outer end of one annular portion of the two to axially smaller-sized parts of the pillar portions.

In short, the portion ranging from the outer end of the annular portion to the axially extending parts of the pillar portions may be provided in any shape if the portion ranging from the outer end of the annular portion to the axially extending parts of the pillar portions is entirely included inside the circle smaller by a specified size than the circumcircle of the engagement portions.

In this embodiment, the edges 9 that are the engagement portions of the retainer are formed in the portions each ranging from the axial outer end of the annular portion 2 in the outer peripheral surface of the annular portion 2 to part of the pillar portions 4. However, the engagement portions of the retainer may be formed at at least one of either annular portion and part of the pillar portions.

Figure 4:
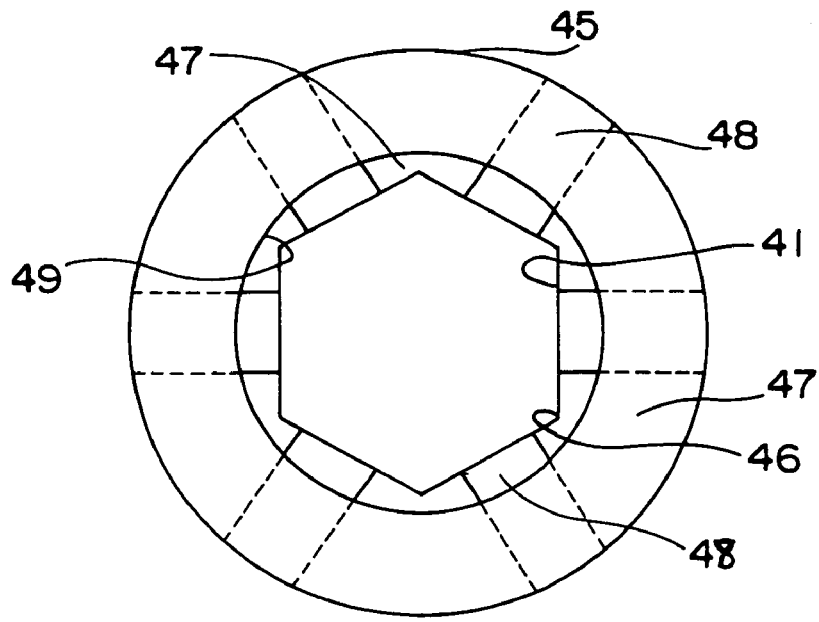
FIG. 4 is a front view showing an embodiment of the retainer in a second aspect.
Figure 5:
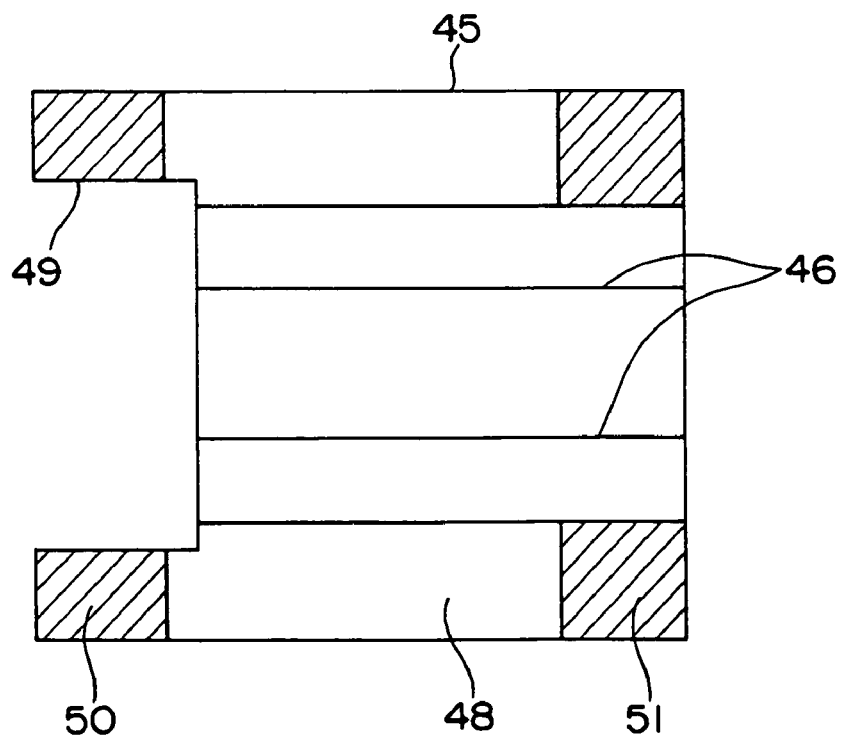
FIG. 5 is a sectional view of the retainer of FIG. 4 along its axial direction.
Figure 6:
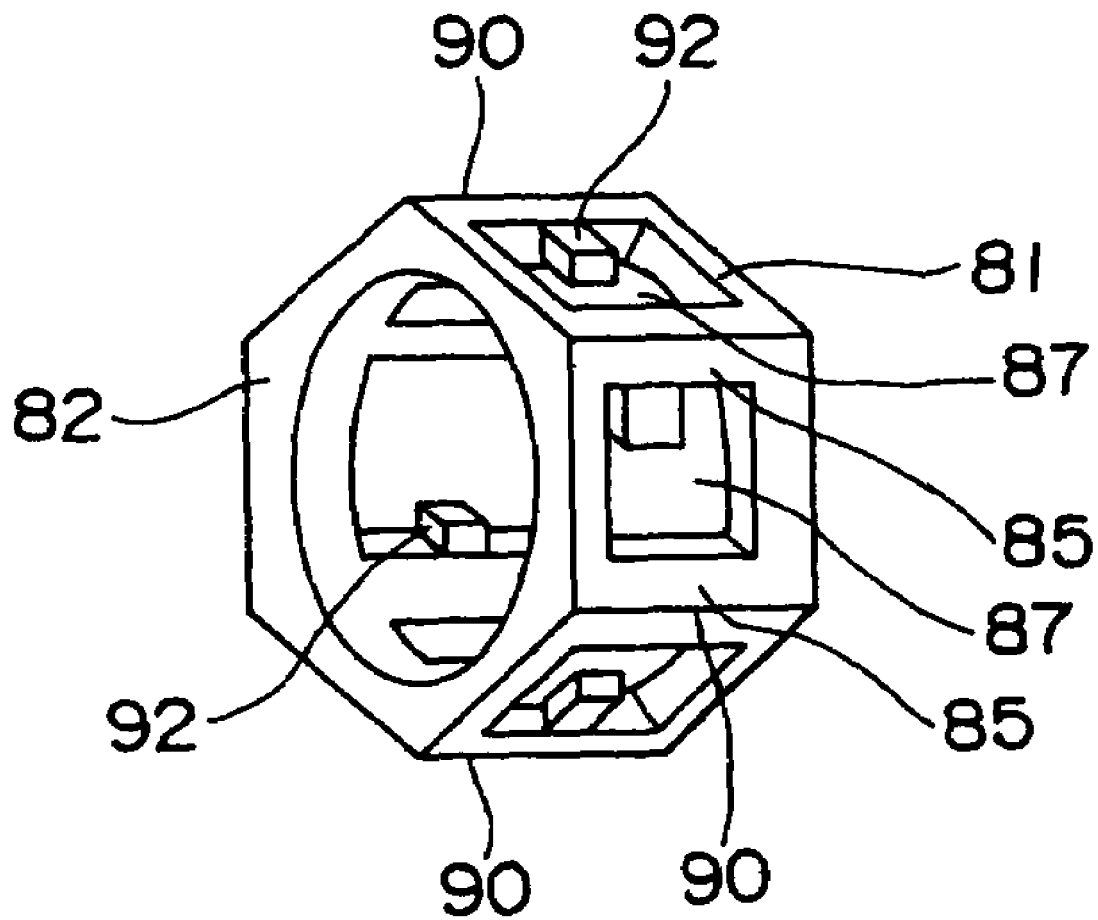
FIG. 6 is a view showing a retainer according to a prior art.

FIG. 4 is a front view of an embodiment of the retainer in a second aspect of the invention. FIG. 5 is a axial sectional view of the retainer of this embodiment.

The retainer, as shown in FIGS. 4 and 5, includes an annular portion 50, an annular portion 51 confronting the annular portion 50, and six pillar portions 47 for axially connecting the two annular portions 50, 51 to each other. Six pockets 48 for placement of rollers are formed between the six pillar portions 47.

The annular portion 51 and most part of each pillar portion 47 which adjoins the annular portion 51 have an inner peripheral surface 41 having a generally regular hexagonal shape in its cross section and a cylindrical outer peripheral surface 45. The six vertices 46 of the inner peripheral surface 41 having a generally regular hexagonal shape in its cross section are to be engaged with edges of an inner peripheral surface of an inner ring having a generally regular hexagonal shape in its cross section in an unshown one-way clutch. The six vertices 46 of the inner peripheral surface 41 having the generally regular hexagonal shape in its cross section serve as engagement portions. The edges of the outer peripheral surface of the inner ring having a generally regular hexagonal shape in its cross section also serve as engagement portions.

Further, the retainer, as shown in FIGS. 4 and 5, has an inner circumferential cylindrical surface 49 serving as an non-engagement inner peripheral surface which ranges from an outer end of the annular portion 50 to an axially extend part of the pillar portion 47 and which is located outside a circle larger by a specified size than the circumcircle of the vertices 46 serving as the engagement portions. In other words, the retainer has a non-engagement inner peripheral surface 49 which is formed in an inner circumferential surface of the annular portion 50 and part of a pillar portion 47 located on the annular portion 50 side and which is not engaged with the inner ring.

According to the retainer of this embodiment, the retainer includes the inner circumferential cylindrical surface 49 that ranges from the outer end of the annular portion 50 to axially extending parts of the pillar portions 47 and that is located outside a circle larger by a specified size than the circumcircle of the vertices 46 serving as engagement portions. As a result of this, part of each roller (not shown) exposed from between the inner peripheral cylindrical surfaces 49 of the pillar portions 47 of the pockets 48 in the retainer assembly formed by placing an unshown roller and a coil spring at each pocket 48 of the retainer can be inserted beforehand at a clearance-fit position between the inner peripheral cylindrical surface of the outer ring and the outer peripheral cam surface of the inner ring at the beginning of assembly for assembling the retainer assembly to between the inner ring and the outer ring. Then, after that, by making the vertices 46 of the retainer in the retainer assembly and the engagement portions (not shown) of the inner ring set to a coincident peripheral position, the retainer assembly can be inserted axially to between the inner peripheral cylindrical surface of the outer ring and the outer peripheral cam surface of the inner ring in the one-way clutch.

Therefore, the one-way clutch can be assembled with simplicity and low cost and without involving any exclusive-use equipment because there is no need for moving the rollers located near wedge positions to near the clearance-fit positions by using some exclusive-use equipment, which would be needed in the conventional assembling method for one-way clutches.

Also, according to the retainer of the embodiment, since the non-engagement inner peripheral surface is provided by the cylindrical inner peripheral surface 49, the non-engagement inner peripheral surface can be machined easily, so that the retainer can be manufactured with low cost.

In addition, in the retainer of this embodiment, the non-engagement inner peripheral surface is formed by one inner peripheral cylindrical surface 49 which ranges from the outer end of the annular portion 50 to the axially extending portion of each pillar portion 47. However, the non-engagement inner peripheral surface may also be formed by one inner peripheral surface which ranges from the outer end of one annular portion of the two to an axially smaller-sized portion of each pillar portion and which has a generally polygonal shape in its cross section or the like. Also, a plurality of cylindrical surfaces of different diameters which are located outside a circle larger by a specified size than the circumcircle of the vertices serving as the engagement portions of the retainer may be formed at portions ranging from the outer end of one annular portion of the two to axially extending parts of the pillar portions. The portion ranging from the outer end of one annular portion of the two to the axially extending parts of the pillar portions may be provided in any shape only if the shape includes the entirety of the portion ranging from the outer end of one annular portion of the two to the axially extending parts of the pillar portions.

Further, in the retainer of this embodiment, the six vertices 46 of the inner peripheral surface 41 serving as engagement portions of the retainer are formed in the portions each ranging from the axial outer end of the annular portion 51 in the outer peripheral surface of the annular portion 51 to part of the pillar portion 47. However, the engagement portions of the retainer may be formed at at least one of either annular portion of the two and part of the pillar portions.

Still also, rollers are used in all of the foregoing embodiments. However, for the present invention, there is used any member to have the function as an engagement element, and therefore there may be provided sprags or the like. The biasing member may be provided by a plate spring.

The invention claimed is:

1. A retainer comprising:
   two annular portions; and
   a plurality of pillar portions for connecting the two annular portions to each other to define a plurality of pockets in combination with the annular portions, wherein
   an engagement portion to be engaged with an outer ring is formed on an outer periphery of one annular portion of the two annular portions and part of each of the pillar portions located on a side of the one annular portion to block the retainer from rotating circumferentially relative to the outer ring,
   a non-engagement outer peripheral surface which is not engaged with the outer ring is formed on an outer peripheral surface of the other annular portion and part of each of the pillar portions located on said other annular portion side, and
   the non-engagement outer peripheral surface is located inside a circle smaller by a specified size than a circumcircle of the engagement portion.

2. The retainer as claimed in claim 1, wherein the non-engagement outer peripheral surface is a cylindrical surface.

3. A one-way clutch comprising:
   an outer ring having an inner peripheral engagement surface which is a cam surface having a generally polygonal shape in its cross section;
   an inner ring having an outer peripheral surface which is a circumferential surface;
   the retainer as defined in claim 1 placed between the inner peripheral engagement surface and the outer peripheral surface;
   rollers placed in the pockets of the retainer; and
   biasing members for respectively biasing the rollers in one circumferential direction.

4. A method for assembling a one-way clutch comprising:
   forming a retainer assembly by respectively placing rollers in the pockets of the retainer as defined in claim 1 and placing biasing members such that each biasing member is disposed between the pillar portion of the retainer and the roller corresponding to the pillar portion;
   inserting the non-engagement outer peripheral surface of the retainer of the retainer assembly axially in an non-engagement state to between an inner peripheral engagement surface of an outer ring and an outer peripheral surface of an inner ring of the one-way clutch so that the roller of the retainer assembly is disposed in a position where the roller is clearance-fitted between the inner peripheral engagement surface of the outer ring of the one-way clutch, which is a cam surface having a generally polygonal shape in its cross section, and the outer peripheral surface, which is a circumferential surface of the inner ring; and
   rotating the retainer assembly such that the engagement portion of the retainer becomes coincident in peripheral position with the engagement portion of the outer ring and thereafter further inserting the retainer assembly axially between the outer peripheral surface of the inner ring and the inner peripheral engagement surface of the outer ring such that the engagement portion of the retainer and the engagement portion of the outer ring are engaged with each other.

5. The retainer as claimed in claim 1, wherein
   the non-engagement outer peripheral surface is an outer peripheral surface of a non-engagement portion formed by the other annular portion, and
   a diameter of a cylindrical inner peripheral surface of the non-engagement portion is substantially equal to a diameter of a cylindrical inner peripheral surface of the engagement portion.

6. The retainer as claimed in claim 1, wherein the non-engagement outer peripheral surface is a cylindrical surface in its cross section with a constant diameter.

7. The retainer as claimed in claim 1, wherein a shape of the non-engagement outer peripheral surface is a polygon in its cross section.

8. The retainer as claimed in claim 1, wherein a shape of the outer periphery of the engagement portion is a regular polygon in its cross section.

9. The retainer as claimed in claim 1, wherein each of the plurality of pillar portions includes a triangular-prismatic portion formed by axially extending an edge of the one annular portion.

10. A retainer comprising:
two annular portions; and
a plurality of pillar portions for connecting the two annular portions to each other to define a plurality of pockets in combination with the annular portions, wherein
an engagement portion to be engaged with an inner ring is formed on an inner periphery of one annular portion of the two annular portions and part of each of the pillar portions located on a side of the one annular portion to block the retainer from rotating circumferentially relative to the inner ring,
a non-engagement inner peripheral surface which is not engaged with the inner ring is formed on an inner peripheral surface of the other annular portion and part of each of the pillar portions located on said other annular portion side, and
the non-engagement inner peripheral surface is located outside a circle larger by a specified size than a circumcircle of the engagement portion.

11. The retainer as claimed in claim 10, wherein the non-engagement inner peripheral surface is a cylindrical surface.

12. A one-way clutch comprising:
an outer ring having an inner peripheral surface which is a circumferential surface;
an inner ring having an outer peripheral engagement surface which is a cam surface having a generally polygonal shape in its cross section;
the retainer as defined in claim 10 placed between the inner peripheral surface and the outer peripheral engagement surface;
rollers placed in the pockets of the retainer; and
biasing members for respectively biasing the rollers in one circumferential direction.

13. A method for assembling a one-way clutch comprising:
forming a retainer assembly by respectively placing rollers in the pockets of the retainer as defined in claim 10 and placing biasing members such that each biasing member is disposed between the pillar portion of the retainer and the roller corresponding to the pillar portion;
inserting the non-engagement inner peripheral surface of the retainer of the retainer assembly axially in an non-engagement state to between an inner peripheral surface of an outer ring and an outer peripheral engagement surface of an inner ring of the one-way clutch so that the roller of the retainer assembly is disposed in a position where the roller is clearance-fitted between the inner peripheral surface, which is a circumferential surface of the outer ring, and the outer peripheral engagement surface, which is a cam surface of the inner ring having a generally polygonal shape in its cross section, of the inner ring of the one-way clutch; and
rotating the retainer assembly such that the engagement portion of the retainer becomes coincident in peripheral position with the engagement portion of the inner ring and thereafter further inserting the retainer assembly axially between the outer peripheral engagement surface of the inner ring and the inner peripheral surface of the outer ring such that the engagement portion of the retainer and the engagement portion of the inner ring are engaged with each other.

14. The retainer as claimed in claim 10, wherein
the non-engagement inner peripheral surface is an inner peripheral surface of a non-engagement portion formed by the other annular portion, and
a diameter of a cylindrical outer peripheral surface of the non-engagement portion is substantially equal to a diameter of a cylindrical outer peripheral surface of the engagement portion.

15. The retainer as claimed in claim 10, wherein the non-engagement inner peripheral surface is a cylindrical surface in its cross section with a constant diameter.

16. The retainer as claimed in claim 10, wherein a shape of the engagement inner peripheral surface is a polygon in its cross section.

17. The retainer as claimed in claim 10, wherein a shape of the inner periphery of the engagement portion is a regular polygon its cross section.

18. A retainer for a one-way clutch, comprising:
a first annular portion;
a second annular portion confronting the first annular portion;
a plurality of pillar portions arranged to connect the first and second annular portions;
a plurality of pocket portions where each pocket portion is formed between two successive pillar portions;
a plurality of triangular-prismatic portions formed by axially extending a corresponding plurality of edges of the second annular portion;
an axially smaller-sized portion formed by axially extending the first annular portion to adjoin the plurality of triangular-prismatic portions, wherein
the second annular portion has an outer peripheral surface whose shape is a regular polygon in its cross section,
the first annular portion has an outer peripheral surface whose shape is a cylinder in its cross section, and
the outer peripheral surface of the first annular portion lies inside a circumcircle of the outer peripheral surface of the second annular portion.

19. A retainer for a one-way clutch, comprising:
a first annular portion;
a second annular portion confronting the first annular portion;
a plurality of pillar portions arranged to connect the first and second annular portions;
a plurality of pocket portions where each pocket portion is formed between two successive pillar portions;
a first inner peripheral surface arranged to axially extend from the first annular portion;
a second inner peripheral surface arranged to axially extend from the second annular portion to adjoin the first inner peripheral surface, wherein
a shape of the first inner peripheral surface is a cylinder in its cross section,
a shape of the second inner peripheral surface is a regular polygon in its cross section, and
the first inner peripheral surface lies outside a circumcircle of the second inner peripheral surface.

* * * * *